June 3, 1930.    K. SCHMIDT    1,760,966
MECHANICAL RECTIFIER
Filed Jan. 23, 1928
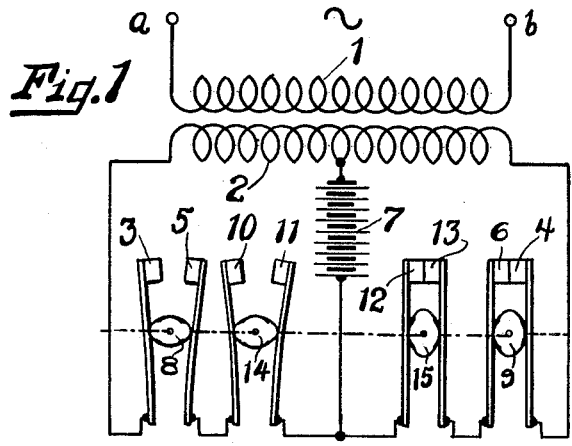
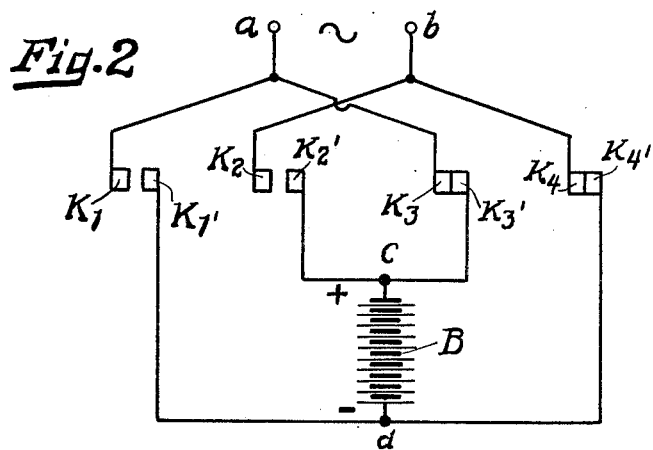
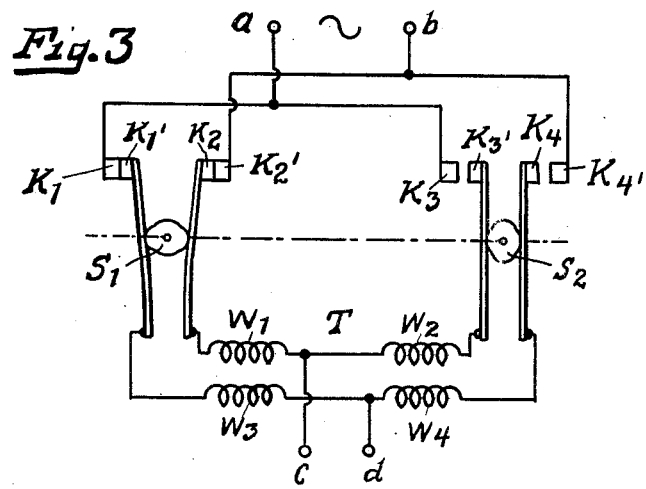
Inventor
Karl Schmidt
By Otto Ratz
Attorney Patented June 3, 1930

1,760,966

UNITED STATES PATENT OFFICE

KARL SCHMIDT, OF BERLIN-LICHTENRADE, GERMANY, ASSIGNOR TO C. LORENZ, AKTIEN-GESELLSCHAFT, OF BERLIN-TEMPELHOF, GERMANY

MECHANICAL RECTIFIER

Application filed January 23, 1928, Serial No. 248,902, and in Germany February 3, 1927.

This application has reference to a rectifier device, particularly those of a general nature as described in my co-pending application 139,179, in which a contact arrangement, for instance, with spring supported contacts, is operated synchronously with alternating current frequency, so that a uni-directional current is sent to the direct current utilization circuit (battery).

The object of my invention is to improve the operation of this device in such a manner as to eliminate the undesirable sparking at the contacts and permit the continuous and enduring operation of the device.

In order to explain my invention more clearly I have illustrated it by the accompanying drawings as follows:

Fig. 1 shows one form conventional connection for a rectifier as applied to mechanically controlled contacts to which my invention may be applied.

Fig. 2 is another type of rectifier connection to which my invention may be applied, and Fig. 3 is a diagram of Fig. 4 to secure the improved operating result, according to my invention.

As will be seen from the diagrams, this invention is particularly adaptable to such rectifiers of alternating current where both half waves of the alternating current are used. A more common connection of this type of rectification consists in utilizing a single transformer, the secondary of which has a center tap connected to the utilization circuit, while the two ends of windings are connected to the opposite poles of rectifier arrangement which may be—as in the examples described—a mechanical contact rectifier. The other poles of said rectifier are connected together to the remaining terminal of the utilization device. Such an arrangement is illustrated in the accompanying Fig. 1.

The terminals of alternating current source $a$ and $b$ are connected to the ends of the primary winding 1 of a transformer. This serves to bring the alternating current potential to a value suitable for the desired rectifier potential (in case it is not the correct value already). The secondary winding 2 of the transformer is connected respectively to contacts 3 and 4 of two contact arrangements which comprise moreover the opposing contacts 5 and 6 respectively. Furthermore, the winding 2 of the transformer is tapped at the middle point, and the tap is connected to the direct current utilization circuit, in the illustrated example to a battery of accumulators 7 to be charged. The other terminal of this battery is connected to the opposing contacts 5 and 6. The contacts 3 and 5, and respectively 4 and 6, of both contact arrangements are mounted on springs and controlled by cams 8 and 9 respectively, which are driven synchronously with the alternating current frequency. In the example, this is accomplished by mounting these cams on the shaft of a small synchronous motor driven from the alternating current supply. The cams are so placed that during one-half period one of the contact arrangements, for instance, 4 and 6, is closed, while during the other half period the other contact arrangement 3 and 5 is closed. As can be easily seen, this will provide in the rectified circuit, that is, the battery 7, a uni-directional current.

Such a mechanical rectifier often has difficulties in operation due to rebounding of springs or due to formation of arcs caused by contact short circuits; thus, for instance, the winding 2 may be short circuited during a short period of time over contacts 3—5 and 6—4 which would cause a strong sparking and eventual destruction of the contacts thereby rendering questionable the practical operation of such a rectifier.

These objections are removed or reduced to a minimum as follows. In addition to the old arrangement as described above, each pair of contacts 3 and 5, and respectively 4 and 6, have in series with them another contact pair 10 and 11, and respectively 12 and 13. These parts are controlled by similar cams 14 and 15 respectively. Thus, if the contacts 12—13 and 6—4 are closed, then the short circuit of the winding 2 through these contacts and also the contacts 3—5 and 10—11 which are approaching the closing point, is not likely to occur. This is because all of these contacts are not likely to close or open at exactly the same time, and, moreover, the short circuit of the winding 2 can be entirely prevented by the proper joints of the closing and opening intervals.

In place of the arrangement of Fig. 1 with the center tap on the transformer, a different arrangement may be utilized similar to the one in the original application, but following the principle of this invention. Also, in place of two pairs of contacts in series, it is possible to utilize several pairs of contacts in series with slightly different periods of operation. One of the alternatives is represented in Figs. 2 and 3, in which four or more pairs of contacts are segregated in two parallel groups connected on one side to the terminals of the alternating current supply and on the other side to the terminals of the direct current utilization circuit. The paralleling arrangement is so chosen that the polarity of the potential at the direct current terminals is always the same.

In Fig. 2, K1, K$_1'$; K2, K$_2'$; K3, K$_3'$; and K4, K$_4'$ are four pairs of spring contacts which are controlled by synchronously operated cams or eccentrics. The latter may be driven by a small synchronous motor. A similar arrangement, however, would be applicable to the case where the contacts are operated by means of magnets (pendulum rectifier). This is controlled in such a way that during one-half period of the alternating current, for example, the contact pairs K1 K$_1'$, and K2 K$_2'$, are open, while the contact pairs K3, K$_3'$, and K4 and K$_4'$ are closed. During the other half period of the alternating current, a reverse relation takes place. The contacts K1 and K3 on one end, and the contacts K2 and K4, on the other hand, are connected with each other, and the joint is applied to one of the terminals $a$ or $b$ of the alternating current supply. In a similar manner the opposite contacts, K$_1'$ and K$_4'$, and respectively K$_2'$ and K$_3'$, are connected with each other, and the joints applied to points C and D of the direct current utilization circuit,—in this case comprising a battery of accumulators B. As can be readily seen, the direction of the current through the battery B is always the same due to the synchronous control as described above. In place of the single contact pair, K1, K$_1'$, etc., it is possible to utilize a number of pairs of contacts in parallel, when the capacity of the rectifier must be larger. It is also possible very simply to construct individual elements which may be introduced in a number corresponding to the amount of rectified current desired.

With this connection I have found in practice one disadvantage for which a remedy will be suggested according to my invention. If the contact pairs, K1 K$_1'$, and K4 K$_4'$, do not operate entirely synchronously which is practically never possible with the simple means available, then it may occur that the opposing contacts K1 and K$_4'$, or contacts K2 and K$_3'$, are short circuited, even though for a short time. To overcome this disadvantage, a doubling up on the pairs of contacts as described in connection with Fig. 1 may be utilized. But in another alternative according to this invention this is accomplished by introducing choke coils in the leads connected to the direct current side (W1, W2, W3 and W4 in Fig. 3). In order to avoid the undesirable self-induction action of these choke coils and the consequent phase shift of the pulsating current flowing through the direct current leads, and at the same time secure a positive action against the short circuit currents through the contacts, I provide that the coils W1 and W2, and respectively W3 and W4, are arranged in the form of a transformer T. The choke coils W1 and W2 form thereby one of the windings with a certain direction of winding, and the coils W3 and W4 form the other winding with an opposite direction of winding. The two sets of windings may be wound one on top of the other but in opposite directions. The direct current terminals C and D are then simply connected to the central points of the two windings.

The connection of the coils W1 and W4, as described above, will be seen to exert—in reference to the half waves of the rectified current which is taken by the terminals C and D—a self-induction in such a way that the coils W1 and W4 simultaneously oppose each other and, similarly, coils W2 and W3 when operating oppose each other. The self-induction is thereby minimized. On the other hand, the short circuit current flowing through the coils W1 and W2, with the same direction of magnetization, or through the coils W3 and W4 in a similar relation, is subject to a large self-inductance which, by the proper design of the coils, may be made sufficient to render the short circuits harmless.

This arrangement as illustrated in Fig. 3 corresponds otherwise to the connections of Fig. 2 and operate similarly. S1 and S2 represent two cams, driven synchronously with the alternating current to be rectified. These cams are so arranged that their action is respectively reversed as can be seen from the figure; that is, during each half period the two pairs of contacts of simultaneous operation are simultaneously closed. For this purpose the opposing contacts K$_1'$ K2, as well as K$_3'$ and K4, are mounted on springs which are moved by the cam.

Having described my invention, what I believe to be new and desire to secure and protect by Letters Patent of the United States is:—

1. In combination, a source of alternating current to be rectified, a pair of coils having equal number of turns and wound oppositely with respect to each other, contacts operating synchronously with said alternating current for connecting said alternating current source alternately to opposite terminals of said coils and circuit connections to the mid point of said coils for conducting the rectified current.

2. In combination, a source of alternating current to be rectified, means for rectifying said alternating current, circuit connections for said rectified currents and inductance coils interposed between said rectifier means and output circuit for preventing a short circuit between the terminals of said alternating current source 3. In combination, a source of alternating current to be rectified, means for rectifying said alternating current, circuit connections for said rectified currents and inductance coils interposed between said rectifier means and output circuit for preventing a short circuit between the terminals of said alternating current source, said coils being so arranged as to constitute substantially no inductance against the normal current flow from said rectifying means.

4. In combination, a source of alternating current to be rectified, means for rectifying said alternating current, circuit connections for said rectified currents and inductance coils in said output circuit interposed between said rectifier means and output circuit for preventing a short circuit between the terminals of said alternating current source, said coils being so arranged as to constitute substantially no inductance against the normal current flow from said rectifying means.

5. A mechanical rectifier comprising input terminals to be connected to an alternating current source, a pair of coils having equal number of turns and wound in an opposite sense with respect to each other, contacts operating synchronously with the alternating current to be rectified for connecting said alternating current source alternatively to corresponding terminals of both coils, and tappings at the mid points of said coils to serve as connection for the direct current output circuit of said rectifier.

In testimony whereof I have affixed my signature.

KARL SCHMIDT.